Patented Apr. 17, 1951

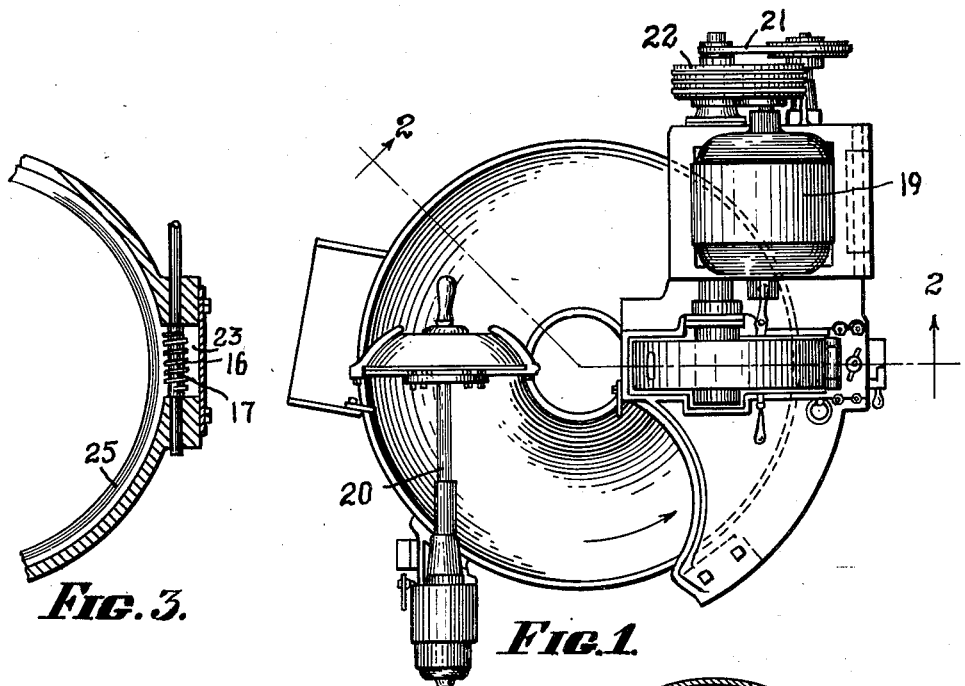
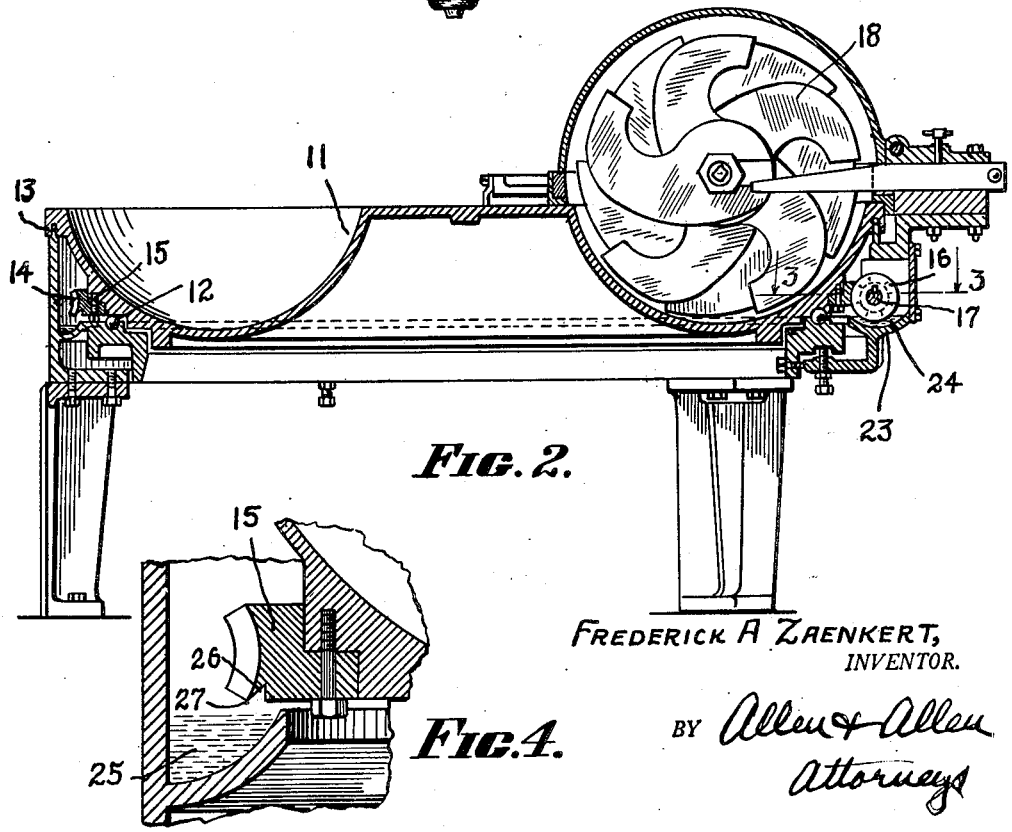

2,549,657

UNITED STATES PATENT OFFICE 2,549,657

LUBRICANT RECOVERY FOR CUTTING MACHINES AND THE LIKE

Frederick A. Zaenkert, Green Hills, Ohio, assignor to The Cincinnati Butchers' Supply Corporation, Cincinnati, Ohio, a corporation of Ohio Application January 2, 1947, Serial No. 719,659

7 Claims. (Cl. 184—13)

This invention relates to lubricant recovery in connection with cutting machines and the like. While the invention is susceptible to many and varied applications, I shall describe it particularly in connection with a cutting machine of the type used in the butchering industry in the cutting or mincing of meat.

In machines of the class above outlined, a rotating bowl is driven by a large annular worm gear fastened to the bowl and cooperating with a worm to which power is applied. When lubricant is supplied to the worm, some of the lubricant is picked up by the worm gear as it rotates and is carried on around the machine where, with present types of construction, the lubricant drips onto the floor, creating a condition which is at once unsightly and dangerous, as well as being wasteful of oil.

It is an object of my invention, therefore, to provide a construction whereby lubricant carried off by the worm gear is recovered without being permitted to drop onto the floor. It is a further object of my invention to return such lubricant to the region where lubricant is initially supplied.

It is a further object of my invention to so construct the worm gear that any lubricant dripping therefrom will not drip beyond a certain point radially inward from the periphery of the gear. A still further object of my invention includes the provision of a gutter in operative relationship with the worm gear and extending inwardly beyond the point mentioned above, at which the lubricant is forced to drip.

These and other objects of my invention which will be pointed out more in detail hereinafter or which will be apparent to one skilled in the art upon reading these specifications, I accomplish by that certain construction and arrangement of parts, of which I shall now describe an exemplary embodiment.

Reference may be had to the drawings forming a part hereof and in which:

Figure 1 is a plan view of a typical machine to which my invention may be applied.

Figure 2 is a vertical cross-sectional view through the same taken on the line 2—2 of Figure 1.

Figure 3 is a fragmentary cross-sectional view taken on the line 3—3 of Figure 1.

Figure 4 is a detailed view on a greatly enlarged scale of the left-hand end of Figure 2.

I have shown my invention applied specifically to a cutting machine as disclosed and claimed in Patent 2,177,600 in the name of O. C. Schmidt, but it will be understood that the invention is applicable in its broadest aspects to any machine in which a large gear rotates in a horizontal plane and in which lubricant is applied in the region of the worm or driving pinion so that the lubricant may be carried around by the teeth of said large gear.

The particular machine illustrated comprises generally a frame 10 in which a bowl 11 is rotatably mounted. The bowl rides on ball bearings 12 and is provided with guiding means indicated generally at 13. Bolted or otherwise fastened to the bowl 11, as at 14, is a large annular worm gear 15 which is driven by means of a worm 16 on a shaft 17.

While the description of the machine itself is unnecessary because it forms no part of my present invention, it may be stated that it includes a cutting head comprising a number of cutting elements 18 driven by a motor 19, as well as an unloading device indicated generally at 20 by means of which material having been cut up in the bowl can be scooped out either toward the center or the outside of the bowl. The worm 16 is driven from the motor 19 through the belting arrangement indicated generally at 21 and 22.

A portion of the frame 10 of the machine in the region where the worm 16 is mounted is formed to provide a trough 23. The trough is of such an extent that lubricant may be supplied thereto, as shown at 24, and the worm dips into the lubricant during rotation.

On the inside of the frame 10 immediately below the locus of the gear 15, I provide an inwardly extending gutter 25 which extends all the way around the machine underneath the annular gear 15, so that any lubricant dripping off the gear 15 may be caught in the gutter and returned to the trough 17.

In order to insure that the gutter 25 will catch all the lubricant dripping off the gear 15, I provide on the under side of said gear immediately inward of the root circle thereof a groove 26. The purpose of the groove 26 is to provide a relatively sharp, downwardly extending edge 27, from which the lubricant can drip and beyond which the lubricant will not flow toward the center of the gear. It will be clear that it is not necessary to provide a groove so long as a relatively sharp downwardly extending lip 27 is provided. With the arrangement described, it is only necessary that the gutter 25 extend inwardly beyond the lip 27 in order to insure that all lubricant dripping from the gear will be caught thereby.

If desired the gutter may be angularly disposed so that lubricant will flow by gravity toward the trough 23, but I have found this to be unnecessary because as long as the level of the oil or lubricant in the trough 23 is lower than the bottom of the gutter, substantially all oil or lubricant will flow back into the trough.

It will be understood from the foregoing description that the particular machine to which my invention is applied does not necessarily form a limitation upon my invention, and that it is capable of use in various kinds of machines in which the problem of recovering lubricant from a gear rotating in a horizontal plane arises. It will, therefore, be understood that I do not intend to limit myself in any way other than as set forth in the claims which follow.

Having now fully described my invention, what I claim as new and desire to secure by Letters Patent is:

1. In a cutting machine, a bowl rotatably carried therein, and an annular gear on said bowl by means of which said bowl may be driven, an annular lip on the underside of said gear, a driving element for said gear, a lubricant trough disposed under said driving element, and an annular gutter positioned at least under the lip portion of said gear and communicating with said lubricant trough to collect lubricant dripping off said annular lip and return it to said trough.

2. In a cutting machine having a frame, a bowl rotatably carried therein, and an annular worm gear on said bowl for driving the same in rotation, an annular lip on the underside of said worm gear, a worm for driving said worm gear, a lubricant trough disposed under said worm for maintaining a body of lubricant in contact with said worm, and an annular gutter mounted on said frame and communicating with said trough, said gutter being positioned at least under the lip portion of said worm gear, so as to catch lubricant dripping from said worm gear and return it to said trough.

3. In combination, a gear rotatable in a horizontal plane and having an annular lip on its underside, and a gutter extending annularly thereof at least under the lip portion of said gear, for catching lubricant dripping from said gear.

4. A machine according to claim 1, in which said annular gear is provided on its under side with an annular lip inwardly of the root circle thereof, and in which said gutter extends inwardly from the frame beyond said annular lip.

5. A machine according to claim 2, in which said annular worm gear is provided on its under side with an annular lip inwardly of the root circle thereof, and in which said gutter extends inwardly from the frame beyond said annular lip.

6. The combination of claim 3, in which said gear is provided with an annular lip on its under side inwardly of the root circle thereof.

7. The combination of claim 3, in which said gear is provided with an annular groove providing an annular lip inwardly of the root circle thereof on its under side.

FREDERICK A. ZAENKERT.

REFERENCES CITED

The following references are of record in the file of this patent:

UNITED STATES PATENTS

| Number | Name | Date |
|---|---|---|
| 1,000,049 | Symons | Aug. 8, 1911 |
| 2,017,260 | Smith | Oct. 15, 1935 |
| 2,210,306 | Schmidt | Aug. 6, 1940 |
| 2,257,895 | Feitinghoff | Mar. 10, 1942 |

FOREIGN PATENTS

| Number | Country | Date |
|---|---|---|
| 128,203 | France | Dec. 31, 1878 |
| 150,603 | Switzerland | Jan. 16, 1932 |